UNITED STATES PATENT OFFICE.

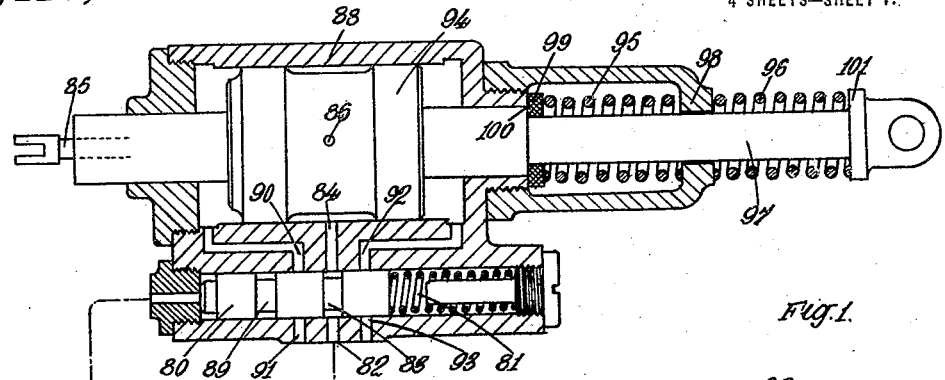
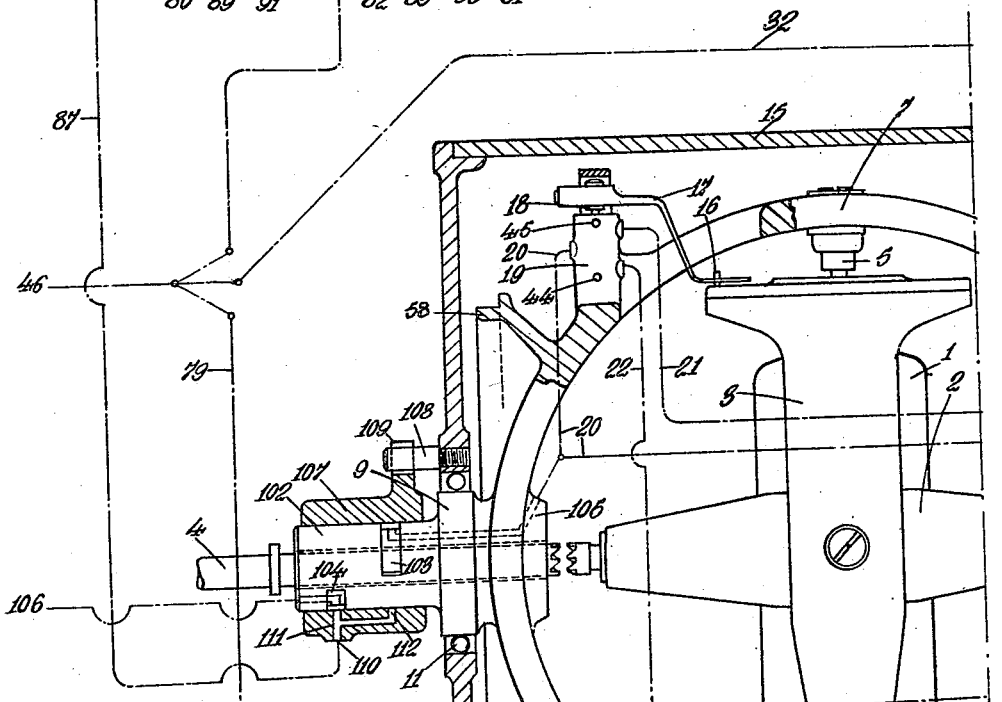
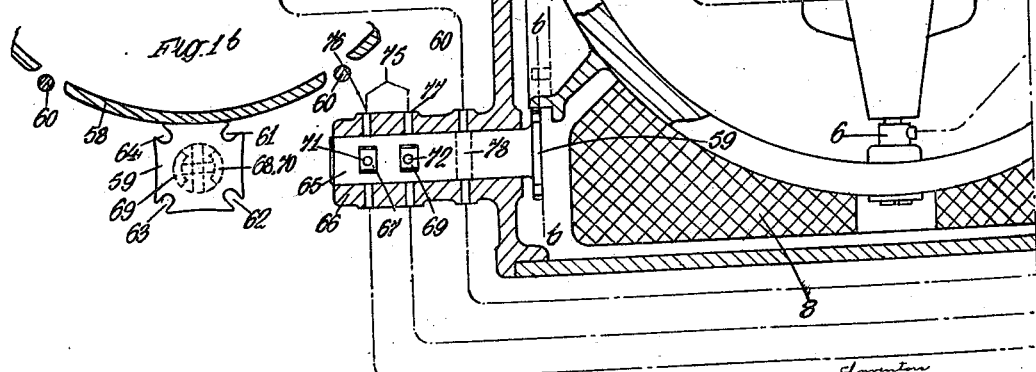

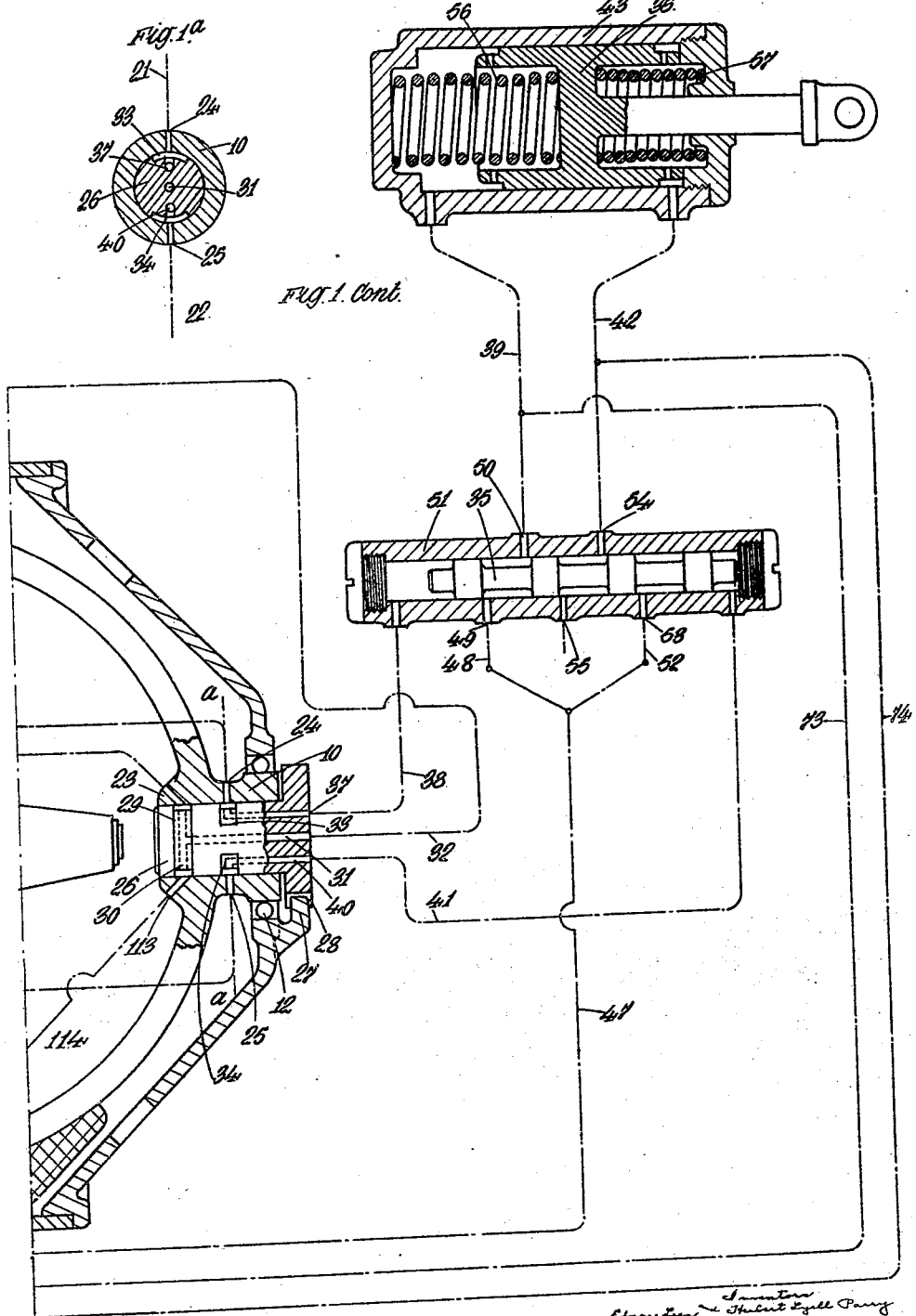

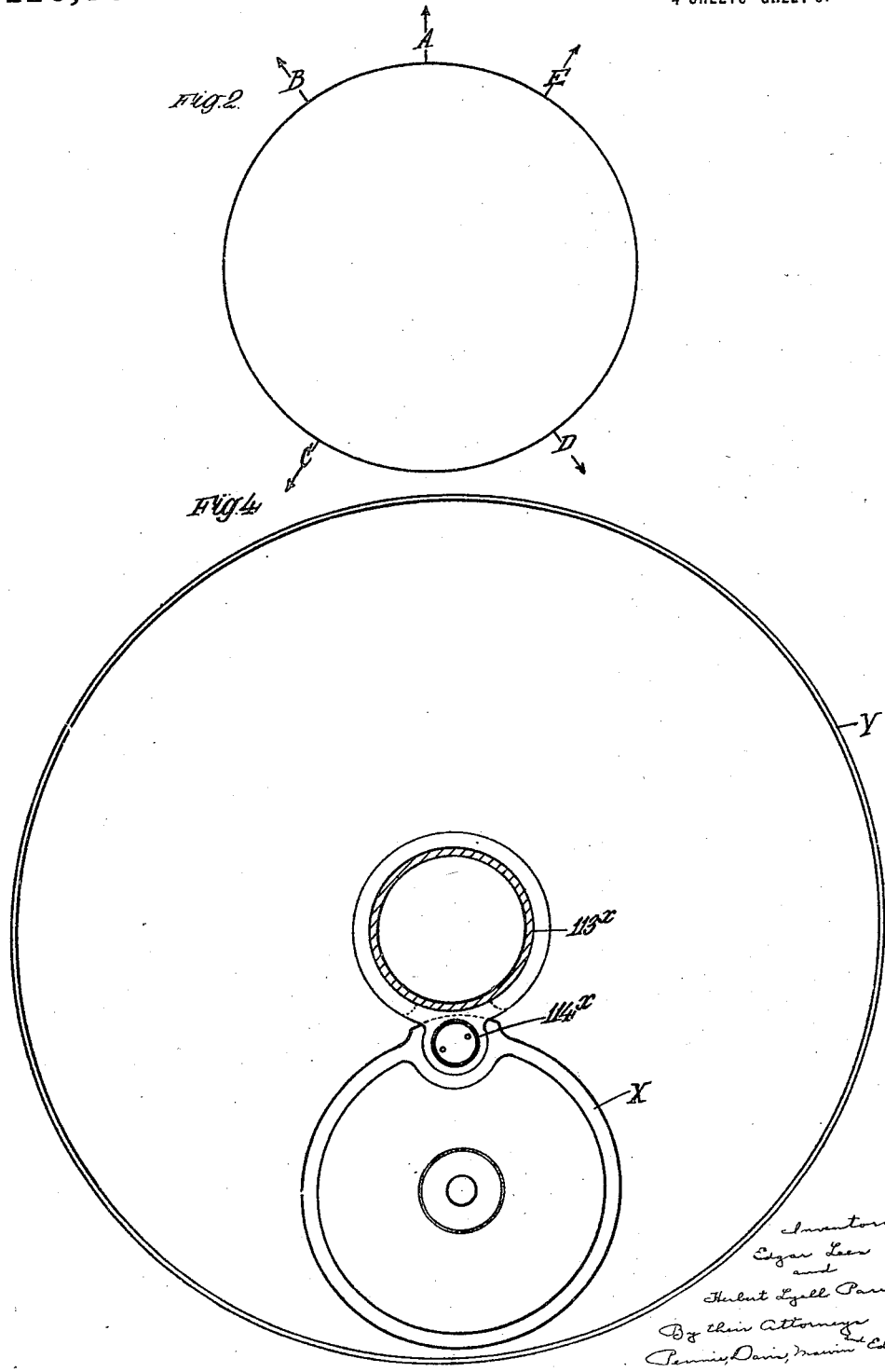

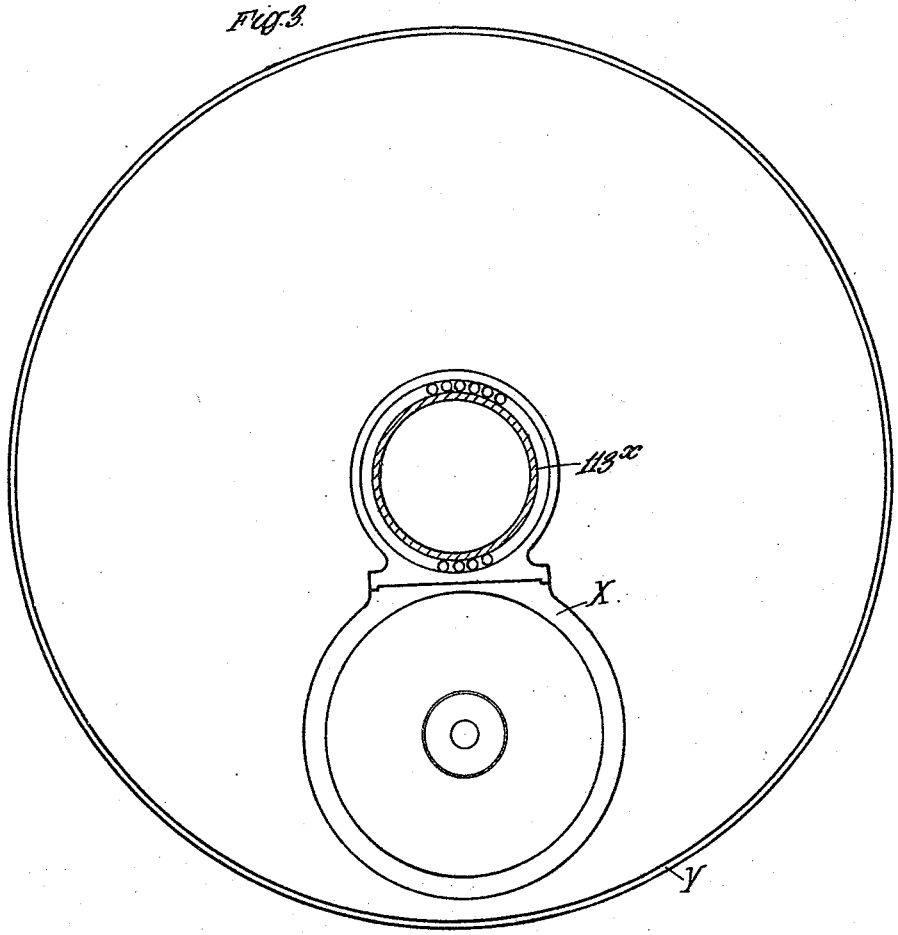

EDGAR LEES AND HERBERT LYELL PARRY, OF WEYMOUTH, ENGLAND, ASSIGNORS TO THE WHITEHEAD TORPEDO WORKS (WEYMOUTH) LIMITED, OF WEYMOUTH, DORSET, ENGLAND.

AUTOMOBILE TORPEDO AND OTHER GYROSCOPICALLY-CONTROLLED MOVING BODY.

1,410,931.          Specification of Letters Patent.    Patented Mar. 28, 1922.

Application filed January 7, 1921. Serial No. 435,698.

*To all whom it may concern:*

Be it known that we, EDGAR LEES and HERBERT LYELL PARRY, both subjects of the King of Great Britain, residing at Portland Harbour Torpedo Works, Weymouth, in the county of Dorset, England, have invented certain new and useful Improvements in or Relating to Automobile Torpedoes and other Gyroscopically-Controlled Moving Bodies, (for which I have filed applications in Great Britain, No. 32,007, dated Dec. 20, 1919, and No. 26,266, dated Sept. 13, 1920,) of which the following is a specification.

This invention relates to automobile torpedoes and other gyroscopically controlled moving bodies.

According to the invention we provide means for so mounting the gyroscopic mechanism in relation to the torpedo or other body that the operation of the said mechanism is not adversely affected by the rolling or heeling of the said body. For this purpose when the invention is employed in connection with torpedoes we may connect the frame carrying the gyroscope to the torpedo by pivots or trunnions the common axis of which lies parallel to or is coincident with the axis of the torpedo and is so arranged that the centre of gravity of the frame and gyroscope thus pivoted lies below the axis of the pivots or trunnions; in this manner the gyroscopic system is free to move, as a pendulum, in a vertical plane and remains relatively uninfluenced by rolling or heeling of the torpedo.

To counteract the effects of the roll and list of the torpedo or other body as regards the rudders themselves (since with a roll or list of 90° the normally horizontal rudders become vertical and so cause deflection and the normally vertical rudders become horizontal and cause incorrect depth keeping) we may provide a device which operates automatically either to centralize the rudders or to lock the same, when a predetermined angle of roll or heel is reached.

In order that the said invention may be clearly understood and readily carried into effect, the same will be more fully described with reference to the accompanying drawings, in which:—

Figure 1 is a vertical section showing more or less diagrammtically a constructional form of our improvements.

Figure 1ª is a section taken approximately on the line *a, a* of Figure 1.

Figure 1ᵇ is a section taken approximately on the line *b, b* of Figure 1.

Figure 2 is a diagrammatic end view of the torpedo shewing different positions of list or roll hereinafter referred to, and Figures 3 and 4 are end views shewing diagrammatically alternative methods of mounting the gyroscopic mechanism.

Referring to Figure 1 the gyroscope mechanism comprises the usual flywheel 1, horizontal inner ring 2, and vertical outer ring 3, the said flywheel being initially spun by a turbine or other means (not shown) through the intermediary in the case of the turbine of a withdrawable clutch-shaft 4. The top and bottom pivots 5, 6, about which the ring 3 is pivoted, instead of being carried by a frame rigidly fastened within the torpedo as is usual, is mounted in accordance with this invention within a circumscribing frame or ring 7 which is adapted to swing about a diametral axis passing through the centre of the gyroscopic mechanism, and by means of a weight 8 is constrained to remain in an upright position when the torpedo rolls. For this purpose the ring is provided with trunnions 9, 10, disposed in ball or roller bearings 11, 12, housed in the end walls of a compositely constructed casing 15. Up to the moment of launching the torpedo the said ring 7 may be locked to the casing 15 in its normal or upright position in order to facilitate the initial spinning up of the flywheel and unlocked by any appropriate known device at (or shortly after) the moment of launching and remain unlocked during the run. The device employed for this purpose has been omitted from Figure 1 in order to avoid confusion with the more essential parts of the invention. The usual air controlling valve employed for the purpose of controlling the distribution of air to and from the gyro steering engine operates in the customary manner when relative motion occurs between the gyroscopic mechanism and the said ring 7 as the torpedo deviates from its predetermined course; that is to say by the operative engagement of a pin 16 on the vertical ring 3 with the usual slotted lever 17 attached to the controlling valve 18. The said controlling valve operates in a chamber 19 mounted on the ring 7, and has an air inlet by way of the passage 20, and top and bottom communication with the gyro steering engine by way of the passages 21, 22 respectively. These passages are connected as shown with appropriate passages 23, 24 and 25 in the aforesaid trunnion 10, and for the purpose of conveying air along the latter passages (in the case of the passage 20 from the air reservoir of the torpedo, and in the case of the passages 21 and 22 to and from the gyro steering engine) the trunnion 10 is formed as a concentrically hollow sleeve surrounding a cylindrical valve plug 26, in such a manner that rotatory motion may take place between the sleeve and the valve plug but not between the latter and the casing 15 owing to the engagement of a projection 27 on the said casing with a slot 28 in the head of the valve plug. By reason of this construction the valve plug is relieved of downward presure due to the total weight of the gimbal system, its circumscribing ring 7 and the weight 8, such total weight being taken by the ball bearings 11 and 12. This valve plug has a complete circumferential groove 29 with which the aforesaid supply passage 23 communicates; this groove receives air through a transverse passage 30 from an axial passage 31, arranged in direct communication with the main air supply by way of a pipe 32 so that the air inlet to the controlling valve 18 is always full open notwithstanding the rolling of the torpedo. An additional passage 113 in the trunnion 10 communicating through the lead 114 to the lower pivot 6 may be provided for supplying air to jets for maintaining the speed of the wheel in the known manner when such jets are used.

The passages 24, 25 in the trunnion 10 are arranged diametrically opposite each other and open into part-circumferential slots or ports 33 and 34 (see Figure 1ª) at the top and bottom respectively of the cylindrical valve plug 26. The slot or port 33 is in communication with an appropriate side of either the usual relay valve 35 (when such is employed) or of the piston 36 of the gyro steering engine, by way of the passage 37 and pipes 38, 39, and the slot or port 34 is correspondingly in communication with the other side of the relay valve 35 or piston 36 by way of the passage 40 and pipes 41, 42.

Whilst the torpedo is normally upright as represented by the position A (Figure 2) or is running with a permanent list not exceeding a predetermined amount as shown on either side of the centre line by the position B or E (Figure 2) (or even when the rolling is of an oscillatory character within these limits), the passages 24 and 25 in the trunnion 10 are respectively in communication through the ports 33 and 34 with the passages 37 and 40. When the roll or list reaches either of the aforesaid predetermined positions B or E, as shown in Figure 2, then by reason of the relative motion occurring between the cylindrical valve plug 26 and the surrounding trunnion 10 taken in conjunction with the circumferential length of the ports 33, 34, the passage of air through the latter becomes closed and the steering engine becomes inoperative. Should the amount of the roll or list continue beyond the aforesaid predetermined limits B or E, then the steering engine will remain inoperative and the gyro rudders centralized until a position C or D (Figure 2) is reached, when the ports 33 and 34 will reopen but will be interchanged relatively to the sleeve 10, the passage 24 (for example) communicating with the passage 40 instead of with the passage 37 as is the case when the torpedo is more or less upright, the gyroscope again functioning but in the reverse manner, such reversal being necessary when the torpedo is running in a more or less inverted position. In the event of the roll becoming so great that the torpedo turns completely over, then the reversed rudders as aforesaid will remain in operation until the top of the torpedo reaches the position D or C when the gyro steering engine will again become inoperative and the gyro rudders centralized. These conditions will obtain until the position E or B is reached where the gyro will again become operative and will control the gyro rudders in the same manner as when the torpedo has only a slight list, within the limiting positions B and E.

In Figure 1 the torpedo is assumed to have deviated from its course in that particular direction to cause the controlling valve 18 to admit air to the relay valve 35 along the passage 37 and the pipe 38 so as to move the relay valve towards the right. The air already at the left hand end of the relay valve exhausts therefrom through the pipe 41, the passage 40, the port 34, the passage 25 and the pipe 22 through the controlling valve 18 and out to atmosphere through a small passage 44 in the customary manner, and similarly through the small passage 45 when the relay valve is moved to the left. With the relay valve towards the right as shewn, air from the same source 46 as that supplying the controlling valve 18 by way of the pipe 32, enters the left hand side of the steering cylinder 43 by way of the pipes 47, 48 and the ports 49, 50 in the relay chamber 51; and similarly through the pipes 47, 52 and ports 53, 54 in the chamber 51, when the relay valve is moved towards the left. In the position shown, the right hand side of the steering engine cylinder is open to exhaust through the ports 54 and 55 in the relay chamber.

For the purpose of centralizing the gyro rudders when the torpedo is rolling between the aforesaid positions B and C or D and E (Figure 2) so that they may not have any ill effect upon the depth keeping of the torpedo, both ends of the cylinder 43 are opened to atmosphere in order that two springs 56 and 57 of equal compressive strength may centralize the piston 36 and also the gyro rudders connected directly thereto. For this purpose the circumscribing ring 7 is provided with a circular rim 58 arranged co-axially with the aforesaid diametral axis about which the said ring is adapted to swing, the said rim 58 forming the locking member of a Geneva movement 59 associated therewith and being provided with pins 60, 60, for operating the movement by successive engagement with each of four slots 61, 62, 63 and 64 as the torpedo, when rolling, passes through the four positions B, C, D and E hereinbefore described. The movement 59 is formed co-axially with a rotary valve 65 carried in a chamber 66 in the wall of the casing 15. This valve has two pairs of circumferentially disposed ports 67, 68 and 69, 70, each pair being diametrally arranged and connected together by passages 71, 72. In the position shown, that is to say when the torpedo is more or less upright and the gyroscopic mechanism is functioning normally, these ports are closed and remain so until the amount of list or roll reaches the position B. Then the said ports open up communication simultaneously between the ends of the cylinder 43 by way of pipes 73 and 74 and an exhaust duct 75 in communication with passages 76 and 77. At the same time a passage 78 in the valve closes the passage of air from the main inlet 46 by way of the pipe leads 79 and 47 through the relay valve and then either of the leads 39 or 42 to the steering engine 43, as hereinbefore described.

For the purpose of centralizing the horizontal rudders or for locking them in any other desired position so that they may not have any ill-effect on the course of the torpedo when the list or roll exceeds the limiting positions B or E, the usual servomotor shown at the top left hand corner of Figure 1 is fitted with a pressure-operated valve 80, normally held in the position shown by a spring 81 so as to allow air from the supply source 46 to enter at 82, pass round the recess 83 in the valve through the port 84 and so to the central valve 85 by way of the port 86 in the usual manner. Should the roll exceed either of the limiting positions, then air is admitted to the left of the valve by way of a lead 87 so as to move it to the right against the resistance of the spring 81. This movement of the valve has the effect of closing the supply passage 84 leading to the central valve and of opening both ends of the cylinder 88 to atmosphere by bringing the recesses 89 and 83 in the valve in line with the ports 90, 91, and 92, 93 respectively. The piston 94 (and as a consequence the horizontal rudders directly attached thereto) now become centralized by the action of the two equal springs 95 and 96 surrounding the steering piston rod 97. The left-hand spring operates between a guide 98 attached to the body of the servomotor, and a loose collar 99 which engages with a step 100 on the piston rod 97, whilst the right-hand spring operates between the aforesaid guide 98 and the head 101 of the piston rod.

In order to admit air to the left-hand side of the valve 80, the trunnion 9 is formed with a hollow plug-valve 102 having ports 103 and 104 of circumferential length dependent upon the angular positions B and E of Figure 2. The port 103 is connected up by way of a passage 105 to the air supply passage 20 whilst the port 104 is constantly open to atmosphere by way of the passage 106. Surrounding the plug-valve 102 is a sleeve 107 keyed to the casing 15 by the engagement of a pin 108 thereon with a slot in an arm 109 on the sleeve. The said sleeve has a passage 110 having two branches 111 and 112, the passage 111 opening into the port 104, whilst the torpedo is more or less upright between the positions B and E, and the passage 112 being shut off from the port 103 during that time. The branched port 110 is connected with the left-hand side of the valve 80 by the aforesaid air lead 87. When however the roll or list exceeds the limits B—E, the port 104 is shut off from the passage 111 whilst the port 103 opens to the branch 112, thereby admitting compressed air through the lead 87 to the left-hand side of the valve 80 as hereinbefore described.

In Figure 3 the gyroscope frame (represented by X) is mounted to swing about a ball bearing surrounding the stern tube 113$^x$ in which the engine propelling shaft rotates and in Figure 4 the gyroscope is suspended from a pivot 114$^x$ depending from the said stern tube 113$^x$; in these two figures Y indicates the shell of the torpedo. In Figure 4 the pivot 114$^x$ and its adjacent parts would be of similar construction to the plug valves 26, 102 and the trunnions 9 and 10 of Figure 1 and in Figure 3 similar constructions would be embodied in the portion encircling the stern tube.

What we claim and desire to secure by Letters Patent of the United States is:—

1. In a gyroscopically controlled moving body, the combination with the gyroscopic mechanism, of means for so mounting said mechanism that it can move relatively to said body in a vertical plane transverse to the longitudinal axis of the body during rolling or heeling of the said body.

2. In a gyroscopically controlled moving body, the combination with the gyroscopic mechanism, of means for so mounting said mechanism that it is free to move as a pendulum in a vertical plane transverse to the longitudinal axis of said body.

3. In a gyroscopically controlled moving body, the combination with the gyroscope, of a frame carrying said gyroscope and means for pivoting said frame to said body so that the frame rocks about a longitudinal axis in said body with the centre of gravity of the gyroscope and frame as a whole disposed below the pivotal axis.

4. In a gyroscopically controlled moving body, the combination with the gyroscopic mechanism controlling a vertical rudder, of means for so mounting said mechanism that its operation is not adversely affected by rolling or heeling of the said body and means for automatically locking said rudder when a predetermined angle of roll or heel is passed.

5. In a gyroscopically controlled moving body, the combination with the gyroscopic mechanism controlling a vertical rudder, of means for so mounting said mechanism that its operation is not adversely affected by rolling or heeling of the said body and means for automatically centralizing said rudder when a predetermined angle of roll or heel is passed.

6. In a gyroscopically controlled moving body, the combination with the gyroscopic mechanism controlling a vertical rudder and a member operating upon a horizontal rudder, of means for so mounting said mechanism that its operation is not adversely affected by rolling or heeling of the said body and means for automatically locking said member when a predetermined angle of roll or heel is passed.

7. In a gyroscopically controlled moving body, the combination with the gyroscopic mechanism controlling a vertical rudder and a member operating upon a horizontal rudder, of means for so mounting said mechanism that its operation is not adversely affected by rolling or heeling of the said body and means for automatically centralizing said member when a predetermined angle of roll or heel is passed.

8. In a gyroscopically controlled moving body, the combination with the gyroscopic mechanism controlling a member operating upon a vertical rudder, of a member operating upon a horizontal rudder, means for so mounting said mechanism that its operation is not adversely affected by rolling or heeling of the said body, and means for automatically locking both said members when a predetermined angle of roll or heel is passed.

9. In a gyroscopically controlled moving body, the combination with the gyroscopic mechanism controlling a member operating upon a vertical rudder, of a member operating upon a horizontal rudder, means for so mounting said mechanism that its operation is not adversely affected by rolling or heeling of the said body and means for automatically centralizing both said members when a predetermined angle of roll or heel is passed.

10. In a gyroscopically controlled moving body, the combination with the gyroscope, of a frame carrying said gyroscope, means for pivoting said frame to said body so that the frame rocks about a longitudinal axis in said body with the centre of gravity of the gyroscope and frame as a whole disposed below the pivotal axis, a motor which is connected to a vertical rudder, means whereby the gyroscope controls said motor, a motor connected to a horizontal rudder and means whereby when the torpedo rolls or heels beyond a predetermined limit, the movement of said frame relatively to the body cuts off air supply to said motors and opens both ends of each of these motors to exhaust.

11. In a gyroscopically controlled moving body, the combination with the gyroscope, of a frame carrying said gyroscope, means for pivoting said frame to said body so that the frame rocks about a longitudinal axis in said body with the centre of gravity of the gyroscope and frame as a whole disposed below the pivotal axis, a motor which is connected to a vertical rudder, means whereby the gyroscope controls said motor, a motor connected to a horizontal rudder, means whereby when the torpedo rolls or heels beyond a predetermined limit, the movement of said frame relatively to the body cuts off air supply to said motors and opens both ends of each of these motors to exhaust, and springs operating on said motors to centralize or approximately centralize the rudders when the ends of said motors are opened to exhaust.

In testimony whereof we affix our signatures.

EDGAR LEES.
HERBERT LYELL PARRY.